Patented May 16, 1950

2,508,256

UNITED STATES PATENT OFFICE 2,508,256

PRODUCTION OF POLAR-SUBSTITUTED ORGANIC PEROXIDES AND PRODUCTS THEREOF

Denham Harman, Berkeley, Calif., assignor to Shell Development Company, San Francisco, Calif., a corporation of Delaware No Drawing. Application December 6, 1948, Serial No. 63,851

9 Claims. (Cl. 260—465.1)

The invention relates to polar-substituted organic peroxides and a process for their production. More particularly, the invention provides a method of accomplishing an ionic addition reaction between organic hydroperoxides and certain olefinic compounds, and provides a novel class of polyfunctional organic peroxides which would be difficult to obtain by other methods of synthesis.

This application is a continuation-in-part of my copending application Serial No. 762,809, filed July 22, 1947, now abandoned.

Hydroperoxides have recently become known and may be produced in various ways. For instance, U. S. Patent No. 2,395,523, issued February 26, 1946, of Vaughan and Rust describes how such products may be made by the controlled oxidation in the presence of hydrogen bromide of branched chain organic compounds which contain a tertiary carbon atom. Thus one may oxidize isobutane and obtain tertiary-butyl hydroperoxide as well as other products. According to another method of producing such compounds, a tertiary alcohol, such as tertiary-butyl alcohol, is added to hydrogen peroxide in the presence of a dehydrating agent such as anhydrous sodium sulfate to cause the formation of the hydroperoxide. Another method consists of reacting a mono-alkyl-salt of an inorganic acid with hydrogen peroxide and neutralizing the product to produce the corresponding hydroperoxide.

Hydroperoxides are compounds of the formula R—O—O—H in which R is a non-acyl radical. In their properties as well as in their structure they are closely analogous to hydrogen peroxide. They are well known oxidizing agents and initiators of polymerization reactions and the reactions heretofore known, between hydroperoxides and unsaturated organic compounds, have been of the type involving the decomposition of the hydroperoxides and the oxidation or polymerization of the unsaturated compounds.

I have now surprisingly discovered that hydroperoxides can be caused to enter into a reaction with an unsaturated compound of the class defined below, which reaction does not involve either polymerization or oxidation of the unsaturated compound or the decomposition of the hydroperoxide. When a hydroperoxide, an unsaturated organic compound of the defined class and an alkaline-reacting compound are brought together in the same liquid phase so that the phase is kept alkaline but does not contain enough base to convert substantially all of the hydroperoxide to a salt, the hydroperoxide molecules add to and saturate doubly-bound carbon atoms of the unsaturated compound.

The unsaturated compounds which enter into this unique reaction are polar compounds containing at least one olefinic double bond not in a conjugate relation with other carbon-to-carbon multiple bonds and containing, attached to one of the carbon atoms joined by such a bond, a polar group which is a "meta-directing" group. The term "meta-directing" group is employed throughout the specification and claims to refer to the substituent groups which, when they are the sole substituent attached to the ring of benzene, direct the entrance of a second substituent predominantly to the meta position. Numerous meta-directing groups are well known to those skilled in the art, including the CHO, COOH, COO(alkyl), COO(metal), CN, CCl$_3$, NO$_2$, SO$_3$H, SO$_2$, CONH$_2$, COCOOH and the like groups which are commonly so designated in the standard chemical texts. In any case, the existence of meta-directing properties is a readily determinable property of any group in question. It will be recognized by those skilled in the art that, as the reaction is conducted in an alkaline medium, acidic groups, such as the carboxyl group, are best neutralized prior to employment in the process. I have found the presence of a meta-directing group in which the attaching atom is an unsaturated atom (particularly, the CN, COO(alkyl), COO(metal), NO$_2$ and CO(alkyl) groups) renders the compound particularly suitable for employment in the process of the invention.

Illustrative examples of olefinic compounds (of which the aliphatic monoolefinic compounds are preferred) containing a meta-directing group attached to a carbon atom joined by an olefinic double bond that reacts in accordance with the process of the invention include nitriles such as crotononitrile, 2,4-pentadienenitrile and 2-octenenitrile; acids (which are best employed as their alkali metal salts) such as acrylic, isohydrosorbic and crotonic; esters such as phenyl acrylate, propyl crotonate and butyl isohydrosorbate; nitro compounds such as 1-nitro-1-propene, 1-nitro-2-cyclohexylethylene, and 1-nitro-1-eicosene; aldehydes such as acrolein, methacrolein and isohydrosorbyl aldehyde; ketones such as methyl vinyl ketone, vinyl carboxyl ketone, propenyl allyl ketone, phorone, mesityloxide, and vinyl benzyl ketone; sulfones such as methyl vinyl sulfone, butyl propenyl sulfone and benzyl propenyl sulfone; and amides such as acrylamide, methacrylamide and crotonamide. Unsaturated organic compounds containing not more than about 20 carbon atoms are of the molecular size preferred for employment in the process of the invention.

The class of unsaturated compounds preferred for employment in the process of the invention are substituted aliphatic monoolefins in which the substituent is attached to a doubly-bound carbon atom and is a meta-directing group, the attaching atom of which is unsaturated. The compounds of this class are typified by acrylonitrile, methyl arcrylate, sodium acrylate, methyl vinyl ketone and 1-nitro-1-propene.

In general, any hydroperoxide which is stable at temperatures above about 0° C. is suitable for employment in the process of the invention, but the employment of hydrocarbon peroxides (compounds of the formula R—O—O—H in which R is a hydrocarbon radical) or their halogen-analogs containing one or more chlorine or bromine atoms is preferred.

Illustrative examples of hydroperoxides which are suitable for employment in the process of the invention include tertiary-butyl hydroperoxide, chloro-tertiary-butyl hydroperoxide, $\alpha,\alpha$-dimethylbenzyl hydroperoxide, ethyl hydroperoxide, benzyl hydroperoxide, cyclohexyl hydroperoxide, cyclohexene hydroperoxide, bromo-tertiary-butyl hydroperoxide, eicosyl hydroperoxide and 1,1-dichloromethylpropyl hydroperoxide. Hydroperoxides containing not more than about 20 carbon atoms are of the molecular size preferred for employment in the process of the invention.

A particularly suitable class of hydroperoxides, for employment in the process of the invention, consists of the tertiary-hydrocarbon peroxides and their halogen-analogs containing one or more chlorine or bromine atoms. This class includes, for example, such substituted or unsubstituted tertiary alkyl hydroperoxides as teritary-butyl hydroperoxide, $\alpha,\alpha$-dimethylbenzyl hydroperoxide, chlorotertiary-butyl hydroperoxide 1-chloromethyl-1-bromomethylpropyl hydroperoxide as well as 1-methylcyclohexyl hydroperoxide.

A solvent is not required in the process, but the presence of a mutual solvent, particularly water, is preferred. In general, any solvent inert to the reactants under the conditions of the reaction may be employed. Illustrative examples of suitable solvents include water, alcohols such as isopropyl, butyl and pentyl alcohol; ethers such as diisopropyl ether, anisol and dioxane; esters such as methyl butyrate, methyl chloroacetate and butyl acetate and liquid amines such as dibutylamine, N-ethyl aniline and pyridine (in the case of the amine, the solvent also functions as the alkaline reacting catalyst).

The addition reaction between the hydroperoxide and the unsaturated compound is catalyzed by the presence of an alkaline-reacting material. In general, any substance which is substantially unreactive with the reactants and is miscible with them, or with a solution of them in the particular solvent employed, can be used as the catalyst.

The alkali metal hydroxides such as sodium hydroxide, potassium hydroxide and lithium hydroxide have been found to be particularly suitable catalysts. Other water-soluble metal hydroxides which are relatively strong bases such as the hydroxides of the alkaline earth metals, barium, strontium, calcium and magnesium, as well as ammonium hydroxide, may also be employed.

Suitable organic catalysts include aliphatic amines such as methyl, ethyl, butyl, amyl, and the like amines; complex ammonium bases such as tetramethylammonium hydroxide; and cyclic amines such as pipereline, pyridene, and the like.

The products provided by the present invention are polyfunctional compounds exhibiting properties characteristic of organic peroxides as well as, respectively, of the acids, nitriles, esters, ketones and the like. For example, methyl tertiary-butylperoxy-propionate, produced from a reaction of tertiary-butyl hydroperoxide and methyl acrylate conducted in accordance with the process of the invention, sputters when heated, and when burned on a filter paper burns with sputtering, thus exhibiting characteristic peroxide properties. Sodium tertiary-butylperoxypropionate is interconverted from acid to salt by the action of acids and metal hydroxide thus exhibiting characteristic acid properties. Tertiary-butyl 2-cyanoethyl peroxide when employed as a catalyst for the emulsion polymerization of an 80:20 methylpentadiene-butadiene mixture produced a polymer having a far higher Mooney plasticity than other polymers prepared under identical conditions from peroxides containing no polar substituent, thus exhibiting not only the characteristic peroxide properties but enhanced properties due to the presence of the polar group in the molecule. In general, the compounds provided by the present invention are particularly valuable in that they provide a means of greatly extending the existing knowledge of peroxidic compounds. In addition to their direct commercial value as peroxides having greatly modified solubility characteristics and as peroxidic compounds from which other types of peroxidic substances can be synthesized (by virtue of the known conversion procedures applicable to the functional groups the present compounds contain in addition to the peroxy group), the compounds undergo the characteristic peroxidic decomposition, and in so doing, form free radicals of structures heretofore unattainable.

As their structure is relatively complex, names of the compounds provided by the present invention do not readily convey their structure to the reader. The compounds can be more clearly visualized as the products of an addition reaction, between a hydroperoxide of the defined class and an unsaturated compound of the defined class, in which a C=C—X group of the unsaturated compound, where X is a meta-directing group, is saturated by the attachment of a hydrogen atom to the doubly-bound carbon atom bearing the least hydrogen atoms, and the attachment of a R—O—O—group to the doubly-bound carbon atom bearing the greatest number of hydrogen atoms.

The reaction involved in the process of the present invention is preferably conducted in the liquid phase. Substantially any pressure can suitably be employed, but the employment of atmospheric or superatmospheric pressure is preferred. The addition reaction is rapid and the process can be conducted as a batchwise or continuous operation. The temperature at which the process is conducted can be varied over wide limits, in general, any temperature of from about 0° C. to the decomposition temperature of the hydroperoxide is suitable. Temperatures within about ten degrees above or below normal room temperature are particularly easy to maintain and are productive of good yields.

The proportions in which the reactants are combined may be varied widely, but as the addition reaction is a mole-to-mole addition, it is preferable to employ the hydroperoxide and the unsaturated compound in substantially equimolar portions, unless it is desirable to conserve a difficultly obtainable hydroperoxide or unsaturated compound by employing an excess of the other. In any case, sufficient alkaline-reacting material should be employed to render the reaction mixture alkaline throughout the mixing of the reactants, and as the addition-reaction occurs between the hydroperoxide and the unsaturated compound, the alkaline-reacting compound should be present in less than the amount required to convert all of the hydroperoxide to the salt. The employment of an amount of an alkaline-reacting material substantially equivalent to from 1 to 5% by weight of potassium hydroxide (based on the weight of hydroperoxide, unsaturated compound and/or solvents) is preferred and the alkaline-reacting material should be added so that such an amount is maintained in the reaction mixture throughout the reaction.

The following examples illustrate in detail the application of the process of the invention to the production of particular compounds. As numerous variations in reactants and reaction conditions are within the scope of the invention, the invention is not to be construed as limited to the particular materials and reaction conditions recited in the application.

*Example I.—Preparation of a cyano-substituted hydrocarbon peroxide*

Tertiary-butyl 2-cyanoethyl peroxide is prepared in accordance with the process of the invention by:

(A) Slowly adding, over a period of 30 minutes, 13.3 cc. (0.2 mole) of acrylonitrile to a mixture of 96.6 cc. of an aqueous 80% solution of tertiary-butyl hydroperoxide with 6 cc. of an aqueous 40% solution of potassium hydroxide, while maintaining the reactants, with stirring, at a temperature of from 30° C. to 35° C.

(B) Slowly adding, over a period of 30 minutes, 13.3 cc. (0.2 mole) of acrylonitrile to a mixture of 96.6 cc. of an aqueous 80% solution of tertiary-butyl hydroperoxide with 9 cc. of an aqueous 30% solution of tetramethylammonium hydroxide, while maintaining the reactants, with stirring, at a temperature of from 15° C. to 20° C.

The substituted peroxide is isolated by removing, by an extraction and/or fractional distillation of the reaction mixture, the unreacted hydroperoxide, nitrile and alkaline catalyst.

Tertiary-butyl 2-cyanoethyl peroxide has the formula, $$CH_3-\underset{\underset{CH_3}{|}}{\overset{\overset{CH_3}{|}}{C}}-O-O-CH_2CH_2CN$$

A sample of tertiary-butyl 2-cyanoethyl peroxide was prepared by the reaction described as (A) above. The reactants were stirred at a temperature of 30° C. to 35° C. for one hour after the addition of the nitrile. The substituted peroxide was isolated by extracting from it, with water, the unreacted hydroperoxide and nitrile. The peroxide was a water-white liquid, $$d_{20}^{20} 0.94$$

$n_D^{20}$ 1.4142 having a characteristic peroxidic odor.

An analysis of the peroxide revealed the following composition and indicated it to be of the above formula,

|  | Found |  | Theory |
|---|---|---|---|
| Per cent C | 58.8 | 58.8 | 58.7 |
| Per cent H | 9.8 | 9.8 | 9.1 |
| Per cent N | 7.4 | 7.6 | 9.8 |
| Per cent M. W. (cryo-benzene) |  | 134 | 143 |
| Eq. wt. (as oxid. agent toward KI) |  | 73.4 | 71.5 |

A non-tertiary hydroperoxide may be employed in the process of the invention in an entirely analogous manner, for example, ethyl 2-cyanoethyl peroxide is prepared by slowly adding 13.3 cc. (0.2 mole) of acrylonitrile to a mixture of 38 cc. of an aqueous 50% solution of ethyl hydroperoxide containing 1 cc. of an aqueous 40% solution of potassium hydroxide, while maintaining the mixed reactants, with stirring, at a temperature of from 20° C. to 25° C.

The substituted peroxide is isolated by removing, by an extraction and/or fractional distillation of the reaction mixture, the unreacted hydroperoxide, nitrile and alkaline catalyst.

Ethyl 2-cyanoethyl peroxide has the formula, $$CH_3CH_2-O-O-CH_2CH_2CN$$

and is a polyfunctional compound which undergoes reactions characteristic of the organic peroxides as well as of the nitriles.

*Example II.—Preparation of an esterified carboxyl-substituted hydrocarbon peroxide*

Methyl 3-tertiary-butylperoxypropionate is prepared in accordance with the process of the invention by slowly mixing 12.3 grams (0.143 mole) of methyl acrylate with 50 cc. of an aqueous 80% solution (0.4 mole) of tertiary-butyl hydroperoxide and 7 cc. of a 40% aqueous solution of potassium hydroxide so that the reaction mixture remains alkaline and while maintaining the mixed reactants, with stirring, at a temperature of from 30° C. to 35° C.

The substituted peroxide is isolated by removing, by an extraction and/or a fractional distillation of the reaction mixture, the unreacted hydroperoxide, ester and alkaline catalyst.

Methyl 3-tertiary-butylperoxypropionate has the formula, $$CH_3-\underset{\underset{CH_3}{|}}{\overset{\overset{CH_3}{|}}{C}}-O-O-CH_2CH_2COOCH_3$$

A sample of methyl 3-tertiary-butylperoxypropionate was prepared by the described reaction process. The mixing of the reactants was started by adding the ester to the hydroperoxide containing 3 cc. of the hydroxide and after 5 cc. of the ester was added, the remainder of the hydroxide was added. The mixed reactants were maintained with stirring, at a temperature of 30° C. to 35° C. for 1 hour. The peroxide was isolated by extracting from it, with water, the unreacted hydroperoxide and ester. The product was a water-white liquid $n_D^{20}$ 1.4142, $$d_{20}^{20} 0.914$$

having the characteristic peroxidic odor. An analysis of the peroxide, and a demonstration that it was free of unsaturation (no bromine was adsorbed by the peroxide when bromine was passed into a solution of the peroxide in carbon tetrachloride), revealed the following composition and indicated the peroxide to be of the above formula,

|  | Found | Theory |
| --- | --- | --- |
| Equivalent weight as oxidizing agent [1] | 90.2, 88.6 | 88.0 |
| Per cent C | 56.4, 56.5 | 54.5 |
| Per cent H | 9.8, 9.8 | 9.06 |
| Mol. wt. (cryo-benzene) | 173 | 176 |

[1] HI—acetic acid method.

*Example III.—Preparation of an acyl-substituted hydrocarbon peroxide*

1-methyl-1-chloromethylpropyl 2 - acetylethyl peroxide is prepared in accordance with the process of the present invention by slowly mixing 21 grams (0.3 mole) of methyl vinyl ketone with 89 cc. of a 50% aqueous solution (0.3 mole) of 1-methyl-1-chloromethylpropyl hydroperoxide containing 1 cc. of a 40% aqueous solution of potassium hydroxide, while maintaining the mixture, with stirring, at a temperature of from 15° C. to 20° C.

The substituted peroxide is isolated by extraction and/or fractional distillation of the reaction mixture.

1-methyl-1-chloromethylpropyl 2 - acetylethyl peroxide has the formula,

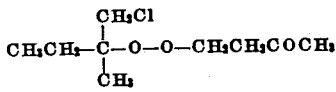

and is a polyfunctional compound which undergoes reactions characteristic of the organic peroxide as well as the reaction of the ketones.

*Example IV.—Preparation of a carboxyl-substituted hydrocarbon peroxide*

3-(α,α-dimethylbenzylperoxy)-propionic acid is prepared in accordance with the process of the invention by slowly adding 38.4 cc. of a 50% aqueous solution of sodium acrylate to 38 grams (0.25 mole) of cumyl hydroperoxide (α,α-dimethylbenzyl hydroperoxide) containing 3 cc. of a 40% solution of potassium hydroxide in water while maintaining the mixed reactants, with stirring, at a temperature of from 20° C. to 25° C.

The substituted peroxide is isolated by making the reaction just acid to litmus and removing by extraction and/or a fractional distillation of the reaction mixture the unreacted hydroperoxide, acid and salts.

3-(α,α-dimethylbenzylperoxy) - propionic acid has the formula,

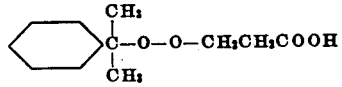

and is a polyfunctional compound which undergoes reactions characteristic of the organic peroxides as well as reactions characteristic of the carboxylic acids.

*Example V.—Preparation of a nitro-substituted hydrocarbon peroxide*

Tertiary - amyl 2 - nitroisopropyl peroxide is prepared in accordance with the process of the present invention by slowly adding 17.4 grams (0.2 mole) of 1-nitro-1-propene to a mixture of 26 cc. of an 80% aqueous solution (0.2 mole) of tertiary-amyl hydroperoxide containing 6 cc. of a 40% aqueous solution of potassium hydroxide while maintaining the mixed reactants, with stirring, at a temperature of from 20° C. to 25° C.

The substituted peroxide is isolated by removing, by an extraction and/or fractional distillation of the reaction mixture, the unreacted hydroperoxide, olefinic compound and alkaline catalyst.

Tertiary-amyl 2-nitroisopropyl peroxide has the formula,

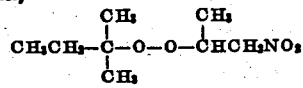

and is a polyfunctional compound which undergoes reactions characteristic of the organic peroxide as well as reactions characteristic of the nitro compounds.

The invention claimed is:

1. Methyl 3-tertiary-butylperoxypropionate.
2. Tertiary-butyl 2-cyanoethyl peroxide.
3. A tertiary-alkyl 2-cyanoalkyl peroxide.
4. An alkyl 3-(tertiary-alkylperoxy)alkanoate.
5. A method of preparing tertiary-butyl 2-cyanoethyl peroxide which comprises heating to a temperature between 20° C. and 100° C. an aqueous solution of acrylonitrile, at least an equivalent amount of tertiary-butyl hydroperoxide, and an amount of an alkali metal hydroxide substantially equal to from 1 to 5% of the weight of the reactants.
6. A method of preparing methyl 3-tertiary-butylperoxypropionate which comprises heating to a temperature between 20° C. and 100° C. an aqueous solution of methyl acrylate, at least an equivalent amount of tertiary-butyl hydroperoxide, and an amount of an alkali metal hydroxide substantially equal to from 1 to 5% of the weight of the reactants.
7. A process for the production of a substituted peroxide, which comprises, mixing a hydrocarbon hydroperoxide with an olefinic compound containing a meta-directing group, the attaching atom of which is an unsaturated atom, attached to a carbon atom joined by an olefinic double bond and an alkaline-reacting compound, in the same liquid phase while maintaining the mixed reactants alkaline and at a temperature of from 10° C. to the decomposition temperature of the hydroperoxide.
8. A process for the production of a substituted peroxide, which comprises, mixing a hydroperoxide with an olefinic compound containing a meta-directing group attached to a carbon atom joined by an olefinic double bond and an alkaline-reacting compound, while maintaining the mixed reactants alkaline.
9. An organic peroxide of the formula

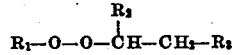

wherein $R_1$ is a tertiary alkyl group, $R_2$ is a member selected from the group consisting of hydrogen atoms and alkyl radicals and $R_3$ is a meta-directing group selected from the group of radicals consisting of —CN,

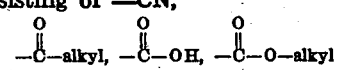

and —NO$_2$.

DENHAM HARMAN.

REFERENCES CITED

The following references are of record in the file of this patent:

UNITED STATES PATENTS

| Number | Name | Date |
| --- | --- | --- |
| 2,403,709 | Dickey et al. | July 9, 1946 |

FOREIGN PATENTS

| Number | Country | Date |
| --- | --- | --- |
| 116,260 | Australia | Dec. 24, 1942 |